Dec. 4, 1923.

W. LOWRY

CUTTING TOOL

Filed April 26, 1922

1,476,019

William Lowry   Inventor

By his Attorneys

Emery, Varney, Blair & Hoguet

Patented Dec. 4, 1923.

1,476,019

UNITED STATES PATENT OFFICE.

WILLIAM LOWRY, OF NEWARK, NEW JERSEY, ASSIGNOR OF ONE-THIRD TO PAUL LANDEMARE, OF NEWARK, NEW JERSEY, AND ONE-THIRD TO ROBERT S. BLAIR, OF STAMFORD, CONNECTICUT.

CUTTING TOOL.

Application filed April 26, 1922. Serial No. 556,596.

*To all whom it may concern:*

Be it known that I, WILLIAM LOWRY, a subject of the King of Great Britain, and a resident of Newark, in the county of Essex and State of New Jersey, have invented an Improvement in Cutting Tools, of which the following is a specification.

This invention relates to cutting tools and, more particularly, to tools for cutting keyways or slots.

One of the objects of this invention is to provide a simple, practical and durable tool for cutting keyways and the like and one that will be of rugged construction, well adapted to fulfil the conditions of practical use. Another object is to provide a tool of the above nature of inexpensive construction, reliable operation and capable of a high speed of cutting action. Another object of this invention is to provide a cutting tool of the above type that may be readily reground or resharpened in a simple manner and without the requirement of a high degree of skill. Other objects will be in part obvious or in part pointed out hereinafter.

The invention accordingly consists in the features of construction, combinations of elements and arrangements of parts as will be exemplified in the structure hereinafter described, and the scope of the application of which will be indicated in the following claims.

In the accompanying drawings in which is shown a possible embodiment of this invention, Figure 1 is a front elevation;

Similar reference characters refer to similar parts throughout the several views of the drawings.

As conductive to a clearer understanding of this invention, it may at this point be noted that in cutting keyways and the like in shafting and like members, the cutters usually employed are of the general nature of milling cutters having a relatively large number of cutting teeth disposed about the periphery of the cutter and extending in a direction generally along that of the axis of the cutter, as well as a plurality of cutting teeth disposed upon the end cutting face of the cutter. The cutters of this type usually employed are exceedingly fragile in that the large number of teeth reduces the amount of material from which each tooth is formed and hence reduces to a very great extent the strength and rigidity of each individual tooth. Furthermore, such cutters are reground only with great difficulty and require special apparatus and skilled labor in the regrinding or resharpening operation. Particularly is this true of keyway milling cutters of the smaller sizes.

The use of cutters of the above-mentioned type is attendant with many disadvantages. Among these disadvantages may be noted the fact that because of the fragile construction, the cutting tool must necessarily be used with a high degree of skill and in the actual use of such a cutting tool the operator, well knowing the defects of the tool, runs the tool at a much lower rate of feed in the attempt to avoid injury to the teeth thereof and to avoid also the necessity of regrinding or resharpening the tool. The use of a milling tool of this type thus results in a greatly decreased rate of production and in a much greater cost of production. It may be stated to be one of the dominant aims of this invention to provide a keyway cutter in which the above-mentioned disadvantages and defects are avoided and by means of which a maximum, and hence more efficient, rate of production as well as a less cost thereof may be attained.

Figure 1:
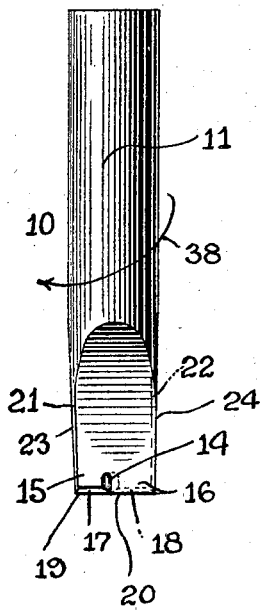
Figure 3:
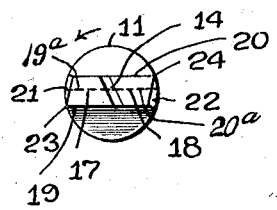
Figure 3 is an end view as seen from the bottom of Fig. 1 of a cutting tool embodying the features of this invention.
Figure 2:
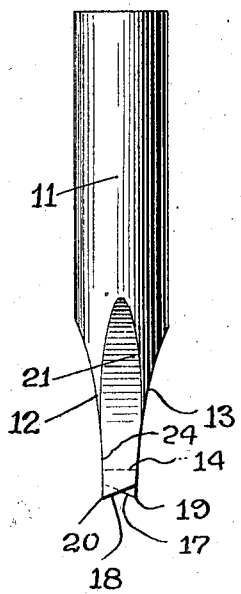
Figure 2 is a side elevation.

Turning now to the drawings, and referring more particularly to Figs. 1, 2 and 3, there is generally indicated at 10 a cutting tool which I prefer to construct out of a suitable tool steel, preferably of round stock or cross section. A suitable length of such round stock before hardening is ground or otherwise suitably formed at the cutting end as will be more clearly hereinafter described, and at the other end is preferably left in its original or circular cross section to form a shank 11 by means of which the tool may be suitably gripped or supported for rotation and for subsequent operation. At the other end or at the cutting end the stock may be cut away on opposite sides, as at 12 and 13 in Fig. 2 of the drawings, so as to terminate in an end portion whose cross section may be considered as being in a general way rectangular. The cutting away of the one end of the stock to form the cutting teeth is preferably accomplished by grinding, it being understood that this forming of the cutting parts of the tool is preferably carried on prior to the hardening of the stock.

A slot 14 is thereupon cut transversely of the substantially rectangularly shaped end of the stock, that is, with the bottom of the slot toward the shank end of the tool. This slot 14, which extends preferably obliquely as shown in Fig. 3, may for example be conveniently cut by means of a saw of suitable thickness. There are thus formed two substantially oppositely disposed extentions 15 and 16 which are thereupon ground obliquely upon their end faces, as at 17 and 18 respectively, so as to form two end cutting lips or teeth. The degree of obliqueness given the end faces or surfaces 17 and 18 of the two cutting teeth 15 and 16 respectively is such that the cutting edges 19 and 20 respectively thus formed are given the requisite amount of clearance, and the degree of obliqueness or what may be termed the clearance angle may be varied at will to suit the requirements of various metals that may be operated upon subsequently. The slot 14 in extending obliquely as above mentioned, insures to the cutting edges 19 and 20 a substantial length and materially greater than the radius of the stock and thus makes for a clean cutting or sweeping action thereof. As will be seen from Fig. 3 of the drawings, the edges 19 and 20 are respectively in advance of the nearest parallel radii 19$^a$ and 20$^a$ as the tool cuts, whereby the edges are backed up by an ample supply of metal and the strength of the cutter increased.

The two cutting teeth 15 and 16 are thereupon ground or backed off at their exterior lateral portions, as at 21 and 22 respectively (see Fig. 3), to provide the lateral cutting edges 23 and 24 respectively. The flat surfaces 21 and 22 formed by the operation just described preferably extend upwardly toward the shank 11 to a substantial extent so that the cutting edges 23 and 24 are of a material length in order that when the tool is placed in operation the cutting edges 23 and 24 will be operative throughout various depths of cut required to be taken. Furthermore, it will be noted that, as is clearly seen in Fig. 3, the grinding or backing off at the lateral portions 21 and 22 of the cutting teeth 15 and 16 respectively is such that the cutting edges 23 and 24 are given a substantial degree of clearness.

The stock of tool steel thus preferably formed as above described preferably by grinding operations is thereupon hardened, whereupon the stock may be tempered to a desired extent to give the cutting portions of the tool the requisite hardness.

Figure 4:
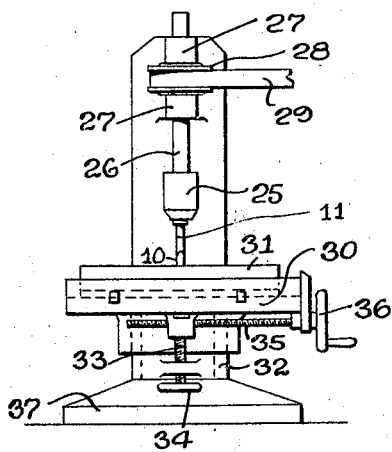
Figure 4 is a diagrammatic view illustrating a possible manner of use of the cutting tool.

In Fig. 4 of the drawings there is shown diagrammatically a chuck 25 supported upon the spindle 26 rotatably mounted in bearings 27 and adapted to be rotated by the pulley 28 and the belt 29. The chuck 25 is adapted to grip the shank 11 of the cutting tool 10 hereinbefore described and to rotatably support it adjacent a suitable table or work support generally indicated at 30. Upon the table 30 there is shown by way of example a section of shafting 31 suitably clamped or rigidly held in position on the table 30 and adjacent the cutting tool 10. The table 30 is mounted in ways diagrammatically illustrated at 32 so as to be adjustable in a vertical direction by means of the screw 33 and the operating hand wheel 34, in order that the work 31 may be adjusted relatively to the cutting tool 10 to vary the depth of cut. The work support 30 is furthermore adjustable or movable in a direction along the axis of the work 31 as by means of the screw 35 and the hand wheel 36, it being understood that the several parts thus described are suitably supported upon a frame fragmentarily indicated at 37.

The cutting tool 10 is made operative first to cut into the work 31 by means of the end cutting edges 19 and 20 to the depth which it is desired to give the slot or keyway, the tool 10 being rotated in the direction of the arrow 38 as shown in Fig. 1. The work 31 is thereupon moved relatively to the tool 10 or crosswise with respect thereto, as by means of the screw 35 and hand wheel 36, at the proper or desired rate of feed. During this action the cutting edges 23 or 24 upon the external lateral portions of the cutting teeth 15 and 16 respectively are operative to cut away the metal of the work 31 and to cut the keyway or slot therein, the end cutting edges 19 and 20 being effective during this operation to sweep or cleanly cut away the bottom of the slot or keyway thus cut.

In the use of the cutting tool 10 the tool may be rotated to give the cutting edges a cutting speed appropriate to the metal operated upon and the rate of feed of the work with respect to the tool may be made maximum. This operation results from the fact that the cutting edges of the tool are rigidly supported by ample amounts of material of the tool 10 itself, and the operator may proceed with the feeding of the work and the cutting operation without the necessity of exercising the high degree of skill usually required where milling cutters having a multiplicity of teeth are employed with attendant dangers of injury to the individual teeth. The tool 10 may be reground or reshaped to provide new cutting edges and it will be noted that this regrinding may take place in a simple manner and that the operator need not exercise the skill nor make use of special apparatus required for regrinding milling cutters of the above-mentioned type. The regrinding may be carried on with substantially no more skill than is required in grinding the usual cutting tools, such as lathe tools for example, used in connection with various machine tools, for each edge is, as shown in the drawings, so shaped as to adapt it to be held against an ordinary grinding surface without cutting or injuring other parts of the tool. Furthermore, the slot 14 provided in the cutting tool 10 not only permits the accurate formation of two distinct end cutting edges, but also permits the quick and rapid regrinding of the end cutting edges as required.

It will be noted also that as the cutting tool is used and reshaped or reground at its cutting edges it need only be further cut away or ground at the opposite sides, as at 12 and 13, as the cutting teeth or extensions 15 and 16 are progressively ground away due to repeated regrinding. The cutting tool is thus one of exceedingly long life, and it will be seen that its use and life may be readily and conveniently extended by proper grinding as above set forth. Moreover, it will be seen that as the cutting tool is progressively ground back, the effective cutting diameter is retained since the side cutting edges 23 and 24 are made to coincide substantially with two elements respectively of the cylindrical stock of which the tool is formed. Thus further disadvantage attendant upon the regrinding of the usual form of milling cutter and resulting in a reduction of the cutting diameter of the milling cutter is effectively avoided. Hence it will be seen that a most efficient use is made of the stock of which the tool is formed.

It will thus be noted that there has been provided in this invention a cutting tool in which the several objects above set forth, as well as others, are attained and in which many advantages are achieved. The cutting tool is of exceedingly inexpensive construction and may, moreover, be readily constructed to meet particular requirements as to the size of keyways or slots desired to be cut; and the great cost of maintaining in stock a great variety of milling cutters of expensive construction and unreliable and inefficient operation is avoided. Furthermore, it will be seen that the tool may be used in practice at great efficiency and without the requirement of a high degree of skill and that it is well adapted to meet the requirements of hard, practical use.

As many possible embodiments might be made of the above invention and as many changes might be made in the embodiment above described, it is to be understood that all matter hereinbefore set forth or shown in the accompanying drawings is to be interpreted as illustrative and not in a limiting sense.

I claim as my invention:

1. A rotary metal cutting tool having a main body portion adapted to form a shank at one end thereof and being formed at the other end thereof into an axially extending cutting member of a cross section of substantially parallelogram form, said extension being substantially centrally slotted transversely to provide two substantially oppositely disposed cutting members.

2. A rotary metal-cutting tool comprising a shank by which it is rotated, and an end portion at the opposite end having a non-radial cutting edge lying in a plane substantially transverse to the axis of the tool, and extending from the circumference of the tool at least substantially half-way across the end of the tool the metal following said edge in the use of the tool being inclined toward said shank and shaped to adapt it to be held against a grinding surface and said end portion being provided with a recess at the axis of the tool.

3. A rotary metal-cutting tool comprising a main body portion of substantially circular cross section forming a shank at one end thereof whereby said cutter may be gripped and supported for rotation and having the material of said body portion removed at opposite sides and at the other end of said main body portion thereby to provide at said end an extension of a cross section of substantially parallelogram form, said extension having a substantially centrally positioned and transversely extending slot thereby to form therefrom two individual and substantially oppositely disposed cutting teeth.

4. A rotary metal-cutting tool comprising a shank by which the tool is rotated, and an end portion at the opposite end having two transverse end cutting edges respectively in advance of and substantially parallel to opposite radii of the tool and having a side cutting edge all parts of which are substantially equi-distant from the axis of the tool.

5. A rotary metal-cutting tool comprising a main body portion of substantially circular cross section forming a shank at one end thereof whereby said cutter may be gripped and supported for rotation and having the material of said body portion removed at opposite sides and at the other end of said main body portion thereby to provide at said end an extension of a cross section of substantially parallelogram form, said extension being shaped to form therefrom two individual and substantially oppositely disposed cutting teeth, said individual cutting teeth having their lateral exposed faces backed off in opposite directions thereby to provide two lateral cutting edges.

6. A rotary metal-cutting tool comprising a shank by which the tool is rotated, and an end portion facing away from said shank having substantially parallel opposite surfaces and terminating in a pair of end cutting edges respectively disposed in said surfaces each edge being offset in the direction in which the tool cuts from the nearest parallel radius of the end of the tool and lying substantially in a plane perpendicular to the axis of the tool.

7. A rotary metal-cutting tool comprising a shank by which it is rotated, and an end portion having a non-radial cutting edge extending inwardly in a plane substantially transverse to the axis of the tool substantially as far as the line extending through said axis and perpendicular to the edge, the metal of said end portion following said edge in the use of the tool being inclined away from said plane toward the shank end of the tool, and said end portion being shaped to provide a side cutting edge substantially parallel to the axis of the tool.

8. A rotary metal-cutting tool comprising a shank by which the tool is rotated, and an end portion having two transverse end edges respectively in advance of and substantially parallel to opposite radii of the tool, and having a pair of side edges respectively terminating at the outer ends of said end edges.

9. A rotary metal-cutting tool comprising a shank by which the tool is rotated, and an end portion having substantially parallel opposite surfaces and terminating in a pair of oppositely disposed end cutting edges respectively disposed in said surfaces and lying substantially in a plane perpendicular to the axis of the tool, said end portion having also a pair of side edges extending substantially parallel to the axis of the tool and having the metal following the same in use relieved in a substantially plane surface.

10. A rotary metal-cutting tool comprising a shank by which the tool is rotated, and an end portion having two transverse end edges respectively in advance of and substantially parallel to opposite radii of the tool, said edges being separated by a transverse slot extending through the end portion of the tool.

11. A rotary metal-cutting tool comprising a shank by which the tool is rotated, and an end portion having substantially parallel opposite surfaces and terminating in a pair of oppositely disposed end cutting edges respectively disposed in said surfaces and lying substantially in a plane perpendicular to the axis of the tool, said end edges being separated by a transverse slot extending through the end portion of the tool and inclined with respect to said edges.

12. A rotary metal-cutting tool comprising an end portion having its opposite surfaces substantially parallel and provided with a pair of end cutting edges oppositely disposed and lying substantially in said opposite surfaces with a substantially flat relief surface for each of said end edges and also provided with side cutting edges.

13. A rotary metal-cutting tool having an end portion terminating in a pair of oppositely disposed end cutting edges and each relieved by a substantially flat surface and provided with a pair of side cutting edges respectively terminating at the ends of said end cutting edges and respectively followed by a substantially flat relieving surface.

14. A rotary metal-cutting tool having an end portion terminating in a pair of oppositely disposed end cutting edges and each relieved by a substantially flat surface and provided with a pair of side cutting edges respectively terminating at the ends of said end cutting edges and respectively followed by a substantially flat relieving surface, said end cutting edges being substantially parallel one with the other and respectively lying in advance of opposite radii of the end of the tool and extending inwardly as far as a plane through the axis of the tool perpendicular to said edges.

In testimony whereof, I have signed my name to this specification this 15th day of April, 1922.

WILLIAM LOWRY.